US010960751B2

(12) United States Patent
Collins

(10) Patent No.: US 10,960,751 B2
(45) Date of Patent: Mar. 30, 2021

(54) COOLING SYSTEM FOR AN ELECTRIC MACHINE

(71) Applicant: FORD GLOBAL TECHNOLOGIES, LLC, Dearborn, MI (US)

(72) Inventor: Patrick Gordon Collins, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 16/167,886

(22) Filed: Oct. 23, 2018

(65) Prior Publication Data

US 2020/0122567 A1 Apr. 23, 2020

(51) Int. Cl.
| | |
|---|---|
| *H02K 3/24* | (2006.01) |
| *B60K 11/02* | (2006.01) |
| *H02K 9/19* | (2006.01) |
| *H02K 9/00* | (2006.01) |
| *B60L 50/50* | (2019.01) |

(52) U.S. Cl.
CPC .............. *B60K 11/02* (2013.01); *B60L 50/50* (2019.02); *H02K 9/005* (2013.01); *H02K 9/19* (2013.01); *B60L 2250/28* (2013.01)

(58) Field of Classification Search
CPC ............ H02K 3/24; H02K 9/005; H02K 9/16; H02K 9/19–9/193
See application file for complete search history.

(56) References Cited

U.S. PATENT DOCUMENTS

| | | | |
|---|---|---|---|
| 7,332,837 B2* | 2/2008 | Ward ..................... | H02K 1/182 310/54 |
| 8,963,383 B2* | 2/2015 | Lucchi ..................... | H02K 3/24 310/54 |

FOREIGN PATENT DOCUMENTS

CN 107666202 A 2/2018

* cited by examiner

*Primary Examiner* — Ramon M Barrera
(74) *Attorney, Agent, or Firm* — David B Kelley; Brooks Kushman P.C.

(57) ABSTRACT

A vehicle includes an electric machine and a coolant tube. The electric machine is configured to propel the vehicle. The electric machine has a stator that includes an array of windings that are arranged in a radial configuration. The coolant tube forms a loop that is routed along an axial end of the stator and adjacent to the array. The tube defines an inlet orifice configured to receive coolant and a plurality of outlet orifices configured to direct the coolant onto the windings.

16 Claims, 3 Drawing Sheets

COOLING SYSTEM FOR AN ELECTRIC MACHINE

TECHNICAL FIELD

The present disclosure relates to hybrid/electric vehicles and electric machines configured to propel hybrid/electric vehicles.

BACKGROUND

Hybrid/electric vehicles may include electric machines that are configured to propel the vehicle.

SUMMARY

A vehicle includes an electric machine and a coolant tube. The electric machine is configured to propel the vehicle. The electric machine has a stator that includes an array of windings that are arranged in a radial configuration. The coolant tube forms a loop that is routed along an axial end of the stator and adjacent to the array. The coolant tube defines an inlet orifice that is configured to receive coolant and a plurality of outlet orifices that are configured to direct the coolant onto the windings.

An electric machine stator includes a core, an array of windings, and a toroidal-shaped coolant tube. The core defines an internal cavity. The array of windings is disposed within the cavity in a radial configuration. The coolant tube is disposed along an axial end of the core and adjacent to the array. The coolant tube defines an inlet orifice that is configured to receive coolant and a plurality of outlet orifices that are configured to direct the coolant onto the windings.

A cooling system for an electric machine includes a coolant tube. The coolant tube is routed along an axial end of an electric machine stator and forms a loop adjacent to an array of radially configured stator windings. The tube defines an inlet orifice that is configured to receive coolant and a plurality of outlet orifices that are configured to direct the coolant onto the windings.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
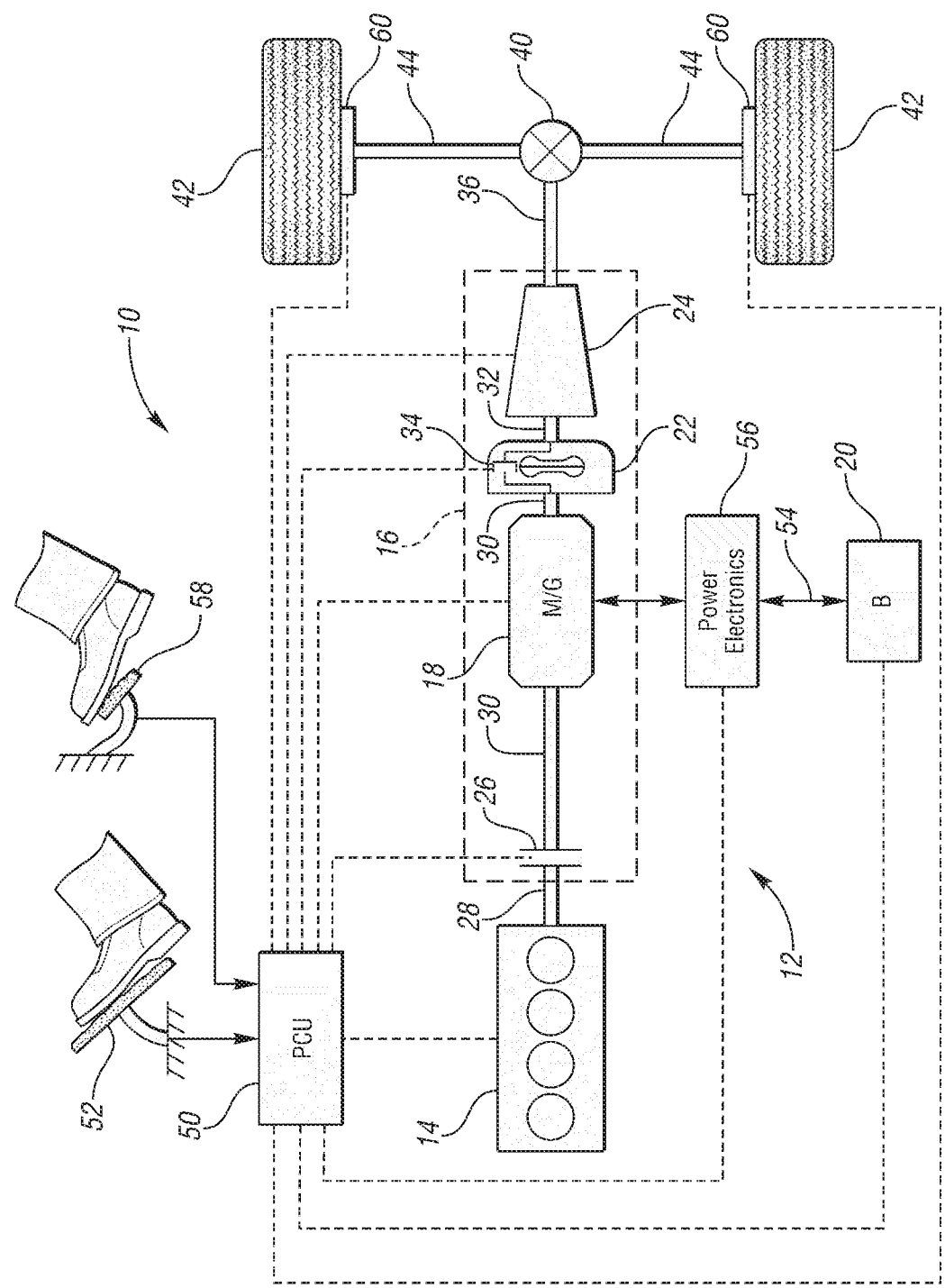
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
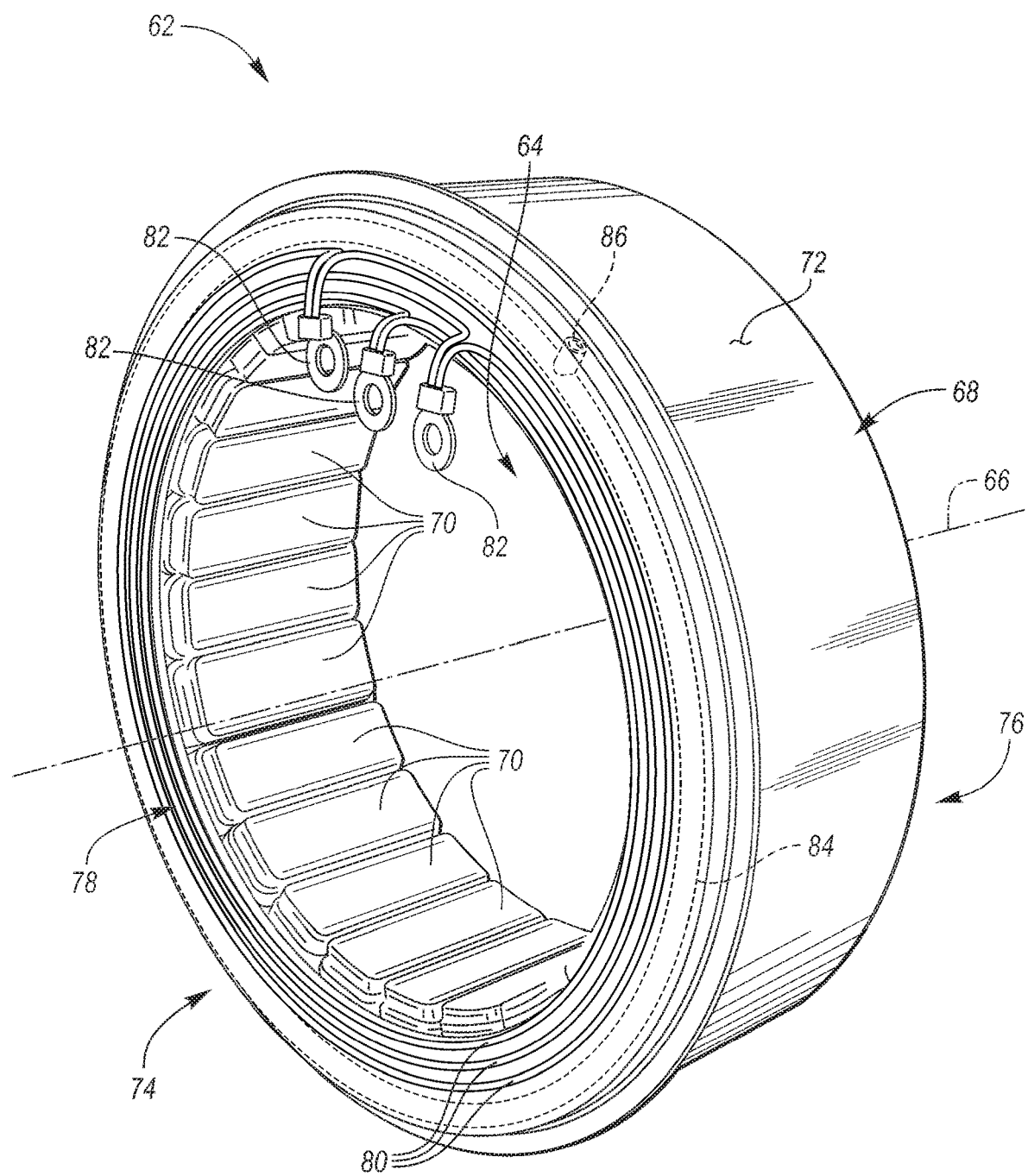
FIG. 2 is an isometric view of a stator of an electric machine.

Referring to FIG. 2, a stator 62 of an electric machine is illustrated. More specifically, the stator 62 may be the stator of the M/G 18 described above. A rotor of the electric machine, which is generally disposed within an internal cavity 64 defined by the stator 62 and which is configured to rotate within the internal cavity 64 about a rotational axis 66, has been removed for illustrative purposes. The stator 62 includes a core 68 and an array of coil windings 70 that are arranged in a radial configuration relative to the rotational axis 66. The core 68, more specifically, defines the internal cavity 64 and the array of coil windings 70 are disposed within the internal cavity 64. The array coil windings 70 are secured to the core 68 and protrude inward and into the cavity 64 from the core 68 in the radial configuration.

The stator 62 may include an external peripheral surface 72 that extends radially about the rotational axis 66. The external peripheral surface 72 may more specifically be an external surface of the core 68. The stator 62 may also include a front axial end 74 and rear axial end 76. The front axial end 74 and the rear axial end 76 may more specifically include any surface or feature of the core 68 and/or the coil windings 70 that define a front end and a rear end of the stator 62, respectively, along the rotational axis 66.

A backing plate 78 may be secured to the either the front axial end 74 or the rear axial end 76 of the stator 62. In the illustrated embodiment, the backing plate 78 is secured to the front axial end 74 of the stator 62. Terminal wires 80 that are configured to electrically connect the coil windings 70 to a power source (e.g., the battery 20 via the power electronics 56) may be secured to the backing plate 78. More specifically, electrical contacts 82 disposed along ends of the terminal wires 80 are configured to electrically connect the coil windings 70 to a power source. The backing plate 78 may be made front an insulating material, such as plastic, to prevent adjacent terminal wires 80 from becoming electrically connected to each other and to ensure that each terminal wire 80 is only connected one phase the coil windings 70 (i.e., to ensure each terminal wire 80 is only connected to one of the phases of the coil windings 70 and is insulated from the other phases of the coil windings 70).

A cooling system for the electric machine, or more specifically for the stator 62 of the electric machine, may include a coolant tube 84. The coolant tube 84 may form a loop that is routed along either the front axial end 74 or the rear axial end 76 of the stator 62. In the illustrated embodiment, the coolant tube 84 forms a loop that is routed along the front axial end 74 of the stator 62. More specifically, the loop formed by the coolant tube 84 may be routed along a flat plane that defines either the front axial end 74 or the rear axial end 76 of the stator 62. The coolant tube 84 and the loop formed by the coolant tube 84 may be adjacent to the to the array of radially configured coil windings 70. More specifically, the coolant tube 84 and the loop formed by the coolant tube 84 may be ring-shaped or toroidal-shaped such that the coolant tube 84 mirrors the radial configuration of the coil windings 70. The coolant tube 84 may be secured to a backside of the backing plate 78. The coolant tube may be disposed between the backing plate 78 and the array of coil windings 70. Alternatively, the tube 84 may be integral to the backing plate 78 adjacent to the array of coil windings 70.

Figure 3:
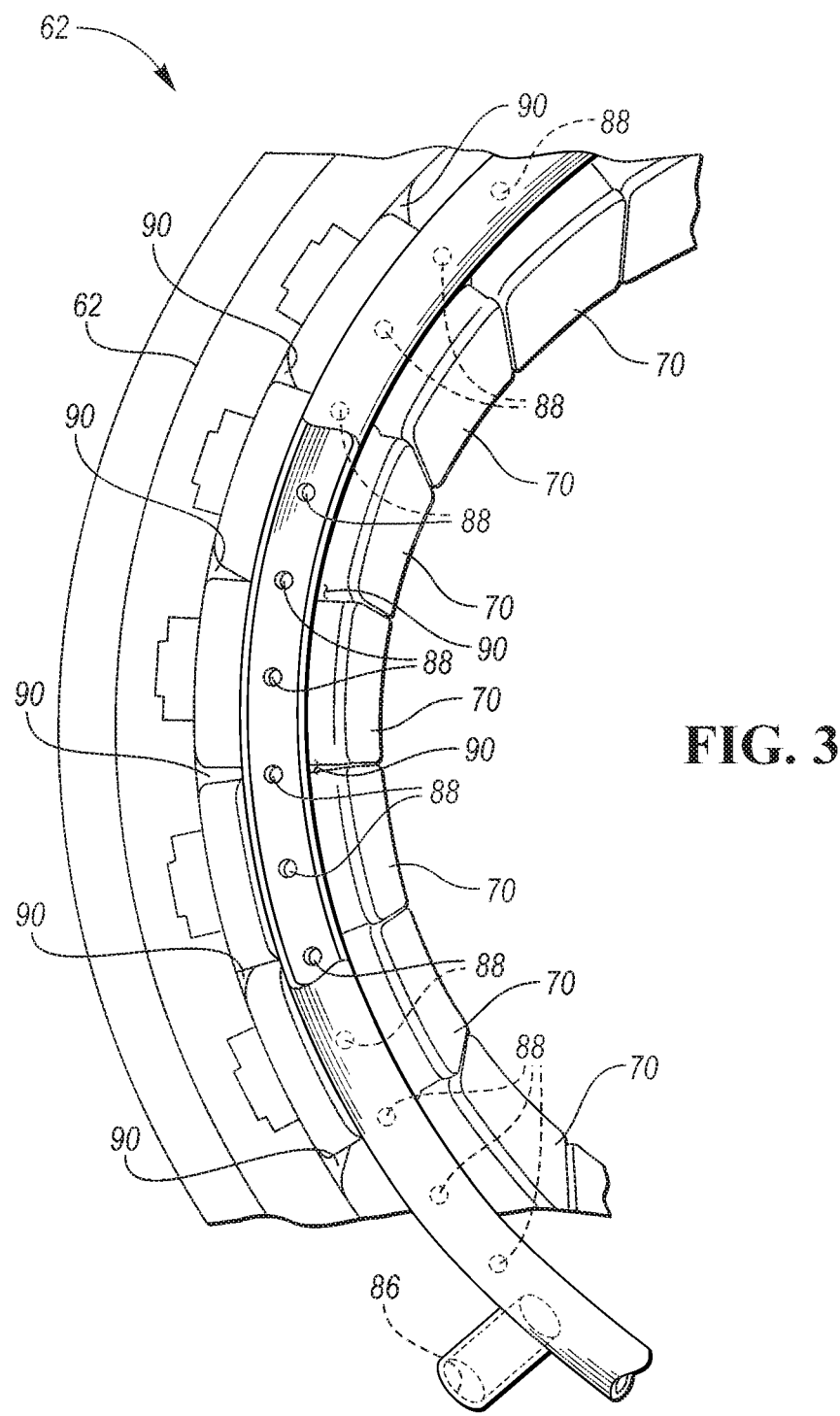
FIG. 3 is a partial view of the stator.

Referring to FIG. 3, a partial view of the stator 62 with the backing plate 78 removed is illustrated. The backing plate 78 has been removed in FIG. 3 for illustrative purposes. More specifically, the backing plate 78 has been removed in FIG. 3 to further illustrate the details of the coolant tube 84. The coolant tube 84 defines an inlet orifice 86 that is configured to receive coolant. More specifically, the inlet orifice 86 may be connected to a pressurized line (not shown) that is configured to deliver transmission fluid (which may act a coolant) from the gear box 24 to the coolant tube 84.

The coolant tube 84 also defines a plurality of outlet orifices 88 that are configured to direct the coolant onto the coil windings 70. More specifically, the outlet orifices 88 are configured to direct the coolant onto the coil windings 70 in a direction that is axial relative to the stator (e.g., in a direction along the rotational axis 66 which is into the sheet in FIG. 3) and substantially perpendicular relative to the loop (e.g., in a direction that is substantially perpendicular relative to the axial end of the stator 62 or the flat plane that the loop formed by the coolant tube 84 is routed along). Substantially perpendicular may refer to any incremental value that is plus or minus 30° from exactly perpendicular. A subset of the plurality of orifices 88 are configured to direct coolant into the spaces 90 between adjacent coil windings 70. The subset of the plurality of orifices 88 that are configured to direct coolant into the spaces 90 between adjacent coil windings 70 are illustrated in FIG. 3 as every other outlet orifice 88 that overlap one of the spaces 90 between adjacent coil windings 70.

The cross-sectional area of the inlet orifice 86 may be greater than the total sum of the cross-sectional areas of the plurality of outlet orifices 88. When the coolant is introduced into the inlet the orifice 86, the difference in cross-sectional areas between the inlet orifice 86 and the total sum of the cross-sectional areas of the plurality of outlet orifices 88 allows the pressure to increase within the coolant tube 84. The increase in pressure in turn increases the velocity and mass rate at which the coolant flows or "sprays" out of the plurality of outlet orifices 88 and onto the coil windings 70. The increase in the mass rate of coolant that is being directed onto the coil windings results in removing more heat and increased cooling of the coil windings.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an electric machine configured to propel the vehicle and having a stator that includes an array of windings arranged in a radial configuration; and
    a coolant tube forming a loop that is routed along an axial end of the stator and adjacent to the array, the tube defining an inlet orifice configured to receive coolant and a plurality of outlet orifices configured to direct the coolant onto the windings, wherein a cross-sectional area of the inlet orifice is greater than a sum of the cross-sectional areas of the plurality of outlet orifices.

2. The vehicle of claim 1, wherein a subset of the plurality of orifices are configured to direct coolant into spaces between adjacent windings.

3. The vehicle of claim 1, wherein the outlet orifices are configured to direct coolant onto the windings in a direction that is axial relative to the stator and substantially perpendicular relative to the loop.

4. The vehicle of claim 1 further comprising a backing plate that is secured to the axial end of the stator, and wherein the coolant tube is secured to the backing plate.

5. The vehicle of claim 4 further comprising terminal wires configured to connect the windings to a power source, and wherein the terminal wires are secured to the backing plate.

6. The vehicle of claim 1, wherein the coolant tube is toroidal in shape.

7. An electric machine stator comprising:
    a core defining an internal cavity;
    an array of windings disposed within the cavity in a radial configuration;
    a toroidal-shaped coolant tube disposed along an axial end of the stator and adjacent to the array, the tube defining an inlet orifice configured to receive coolant and a plurality of outlet orifices configured to direct the coolant onto the windings;
    a backing plate that is secured to the axial end of the stator, wherein the coolant tube is secured to the backing plate; and
    terminal wires configured to connect the windings to a power source, wherein the terminal wires are secured to the backing plate.

8. The stator of claim 7, wherein a cross-sectional area of the inlet orifice is greater than a sum of the cross-sectional areas of the plurality of outlet orifices.

9. The stator of claim 7, wherein a subset of the plurality of orifices are configured to direct coolant into spaces between adjacent windings.

10. The stator of claim 7, wherein the outlet orifices are configured to direct coolant onto the windings in a direction that is axial relative to the stator and substantially perpendicular relative to the tube.

11. A cooling system for an electric machine comprising:
a coolant tube routed along an axial end of an electric machine stator and forming a loop adjacent to an array of radially configured stator windings, the tube defining an inlet orifice configured to receive coolant and a plurality of outlet orifices configured to direct the coolant out of the coolant tube and directly onto the windings, wherein a cross-sectional area of the inlet orifice is greater than a sum of the cross-sectional areas of the plurality of outlet orifices.

12. The cooling system of claim 11, wherein a subset of the plurality of orifices are configured to direct coolant into spaces between adjacent windings.

13. The cooling system of claim 11, wherein the outlet orifices are configured to direct coolant onto the windings in a direction that is axial relative to the stator and substantially perpendicular relative to the loop.

14. The cooling system of claim 11 further comprising a backing plate that is secured to the axial end of the stator, and wherein the coolant tube is secured to the backing plate.

15. The cooling system of claim 14 further comprising terminal wires configured to connect the windings to a power source, and wherein the terminal wires are secured to the backing plate.

16. The cooling system of claim 11, wherein the coolant tube is toroidal in shape.

* * * * *